United States Patent
O'Connor

(10) Patent No.: US 6,832,815 B2
(45) Date of Patent: Dec. 21, 2004

(54) SEATBACK DUMP LATCH

(75) Inventor: James G. O'Connor, Oxford, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/254,557

(22) Filed: Sep. 25, 2002

(65) Prior Publication Data
US 2004/0056524 A1 Mar. 25, 2004

(51) Int. Cl.⁷ .................................................. B60N 2/02
(52) U.S. Cl. ..................................................... 297/378.12
(58) Field of Search ....................... 297/354.12, 378.11, 297/378.12, 378.1

(56) References Cited

U.S. PATENT DOCUMENTS

| | | | |
|---|---|---|---|
| 4,103,964 A | * | 8/1978 | Klingelhofer et al. ...... 297/367 |
| 4,252,369 A | * | 2/1981 | Kluting |
| 5,383,699 A | * | 1/1995 | Woziekonski et al. ..... 296/65.1 |
| 5,460,429 A | * | 10/1995 | Whalen .................. 297/378.11 |
| 5,522,643 A | * | 6/1996 | Matsuura ..................... 297/367 |
| 5,611,600 A | * | 3/1997 | Busch et al. ........... 297/378.12 |
| 5,904,403 A | * | 5/1999 | Unckrich ............... 297/378.12 |
| 6,139,104 A | * | 10/2000 | Brewer ....................... 297/353 |

* cited by examiner

Primary Examiner—Peter M. Cuomo
Assistant Examiner—Stephen Vu
(74) Attorney, Agent, or Firm—Bill C. Panagos

(57) ABSTRACT

A seat latch assembly that includes a seat bottom that has a first frame member, a seat back that has a second frame member that is partially mounted on the first frame member about a first pivot, and a latch mechanism. The latch mechanism includes a pin mounted on one of the first and second frame members. The latch pivotally attaches to the other of the first and second frame members about a second pivot. The latch has an open angled hook portion and is movable about the second pivot between a disengaged position and an engaged position. In the disengaged position, the hook portion is spaced from the pin. In the engaged position, the hook portion is in contact with the pin to hook the pin to prevent the first frame member from pivoting relative to the second frame member about the first pivot.

14 Claims, 6 Drawing Sheets

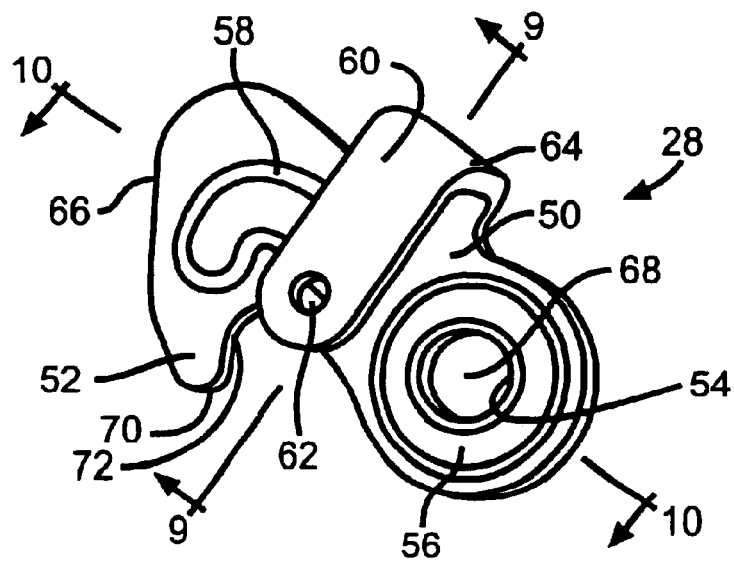
FIG. 8
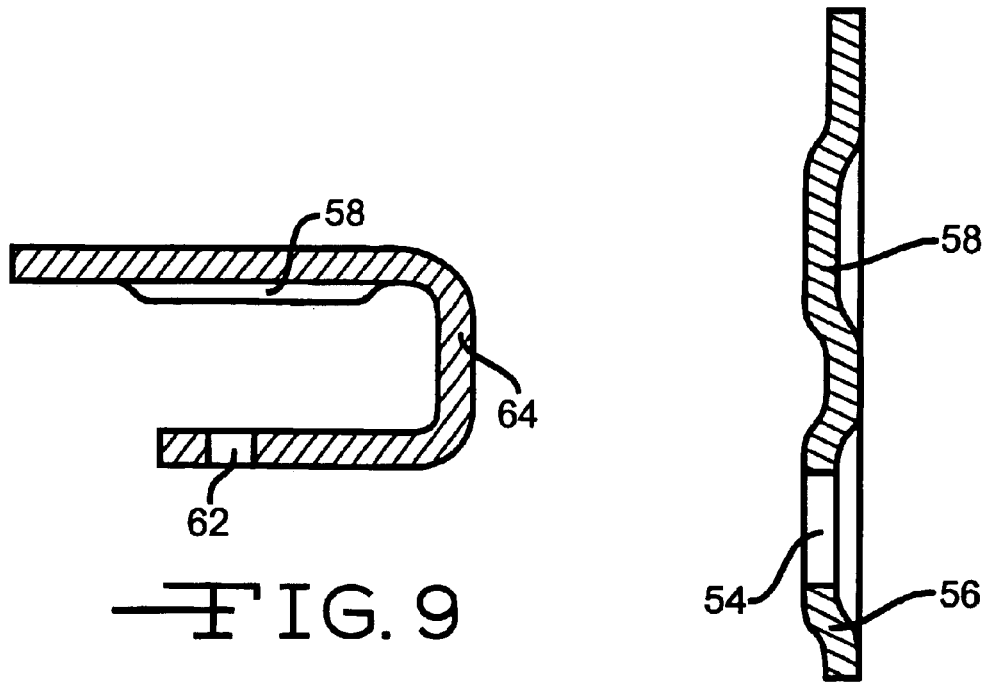
FIG. 9
FIG. 10

SEATBACK DUMP LATCH

BACKGROUND OF THE INVENTION

Many automobiles include two rows of seats: a front row seat or seats and a rear row seat or seats. Especially for two door vehicles, the front seats often have mechanisms that allow the front row of seats to recline or move forward a relatively large amount to allow easy entry or access to the rear row of seats. Forward reclining of seats is commonly referred to as dumping. Conventional mechanisms include latches that permit the unlatching of the front row seat back recliner to pivot in a forward direction. After the rear row occupant is seated, the seat can be moved rearward back to its normal position. Some vehicle seats are also equipped with recliners that adjust the angle of the front seat back relative to the seat bottom for occupant comfort. To provide easy rear seat entry, these conventional seats include an additional mechanical latch that disengages the linkages to permit the seat back to be manually pivoted forward by a relatively large amount.

These seat latches are designed to sustain large forces during normal use, e.g. the weight and movement of the occupant, and even larger forces during an impact. Under vehicle impact conditions, large impact forces may be delivered to the seat back in both a rearward or frontal impact. In a rearward impact, the occupant is forced against the seat back, and the seat may therefore experience a large energy pulse. Similarly, in a forward impact and in vehicle seats which incorporate a belt restraint system directly connected to the seat back, the occupant will engage the restraint system, and therefore cause a relatively large energy pulse or force acting on the seat back via the restraint system. A latching device can be adapted to be attached between a seat back, a seat bottom, and/or a seat track.

In the past, more than one latching mechanism was used on seats to control reclining and dumping and to provide sufficient support against large forces. If a single mechanism was used, it was typically bulky. These bulky devices were also relatively heavy and expensive. Additionally, these bulky devices made reclining or dumping the seat more difficult since larger spring forces were required to move the mechanisms. Also, these mechanisms only managed the forces applied to the seat and did not assist with other undesirable seatback motion.

Strong seatback supports commonly have the additional drawback what is commonly known as "chucking" motion. This is the undesirable differential movement of the seatback relative to the seat bottom. Generally, the seat recliner is pivotably connected to the seatback and seat frame at a pivot point and the seatback is pivotably connected to the seat frame or seat back at a second pivot point. As a result, the seatback becomes a lever arm upon which forces are applied. These forces, when coupled with the play within the latch mechanism causes the seatback chucking motion. This occurs even if the seat is in a locked position. This movement is exacerbated by the length of the seat and the motion, therefore, is more noticeable at the upper end of the seat. For example, the seatback may tend to oscillate when the vehicle encounters rough road conditions or travels at high speeds. In order to reduce the chucking motion, bulky or close tolerance pivot mechanisms have previously been used. However, due to the size and cost limitations, an alternate mechanism that is less costly and occupies a reduced space would be beneficial. Also, a mechanism that combines the strength and support benefits of a strong load-supporting latch with anti-chucking properties would be beneficial.

SUMMARY OF THE INVENTION

The invention relates to a seat latch assembly that includes a seat bottom that has a first frame member, a seat back that has a second frame member that is partially mounted on the first frame member about a first pivot, and a latch mechanism. The latch mechanism includes a pin mounted on one of the first and second frame members. The latch pivotally attaches to the other of the first and second frame members about a second pivot. The latch has an open angled hook portion and is movable about the second pivot between a disengaged position and an engaged position. In the disengaged position, the hook portion is spaced from the pin. In the engaged position, the hook portion is in contact with the pin to hook the pin to prevent the first frame member from pivoting relative to the second frame member about the first pivot.

The hook portion of the seat latch assembly includes a flat formed therein that defines a first line. A line is formed at an angle $\beta$ that is greater that 90 degrees relative to a second line defined by a line extending through the second pivot and the flat. The angle $\beta$ is preferably 95.7 degrees.

Various objects and advantages of this invention will become apparent to those skilled in the art from the following detailed description of the preferred embodiment, when read in light of the accompanying drawings.

BRIEF DESCRIPTION OF THE DRAWINGS

FIG. 8 is perspective view of the latch according to the present invention.

FIG. 9 is a sectional view of the latch shown in FIG. 8 through line 9—9.

FIG. 10 is a sectional view of the latch shown in FIG. 8 through line 10—10.

DETAILED DESCRIPTION OF THE PREFERRED EMBODIMENT

Figure 1:
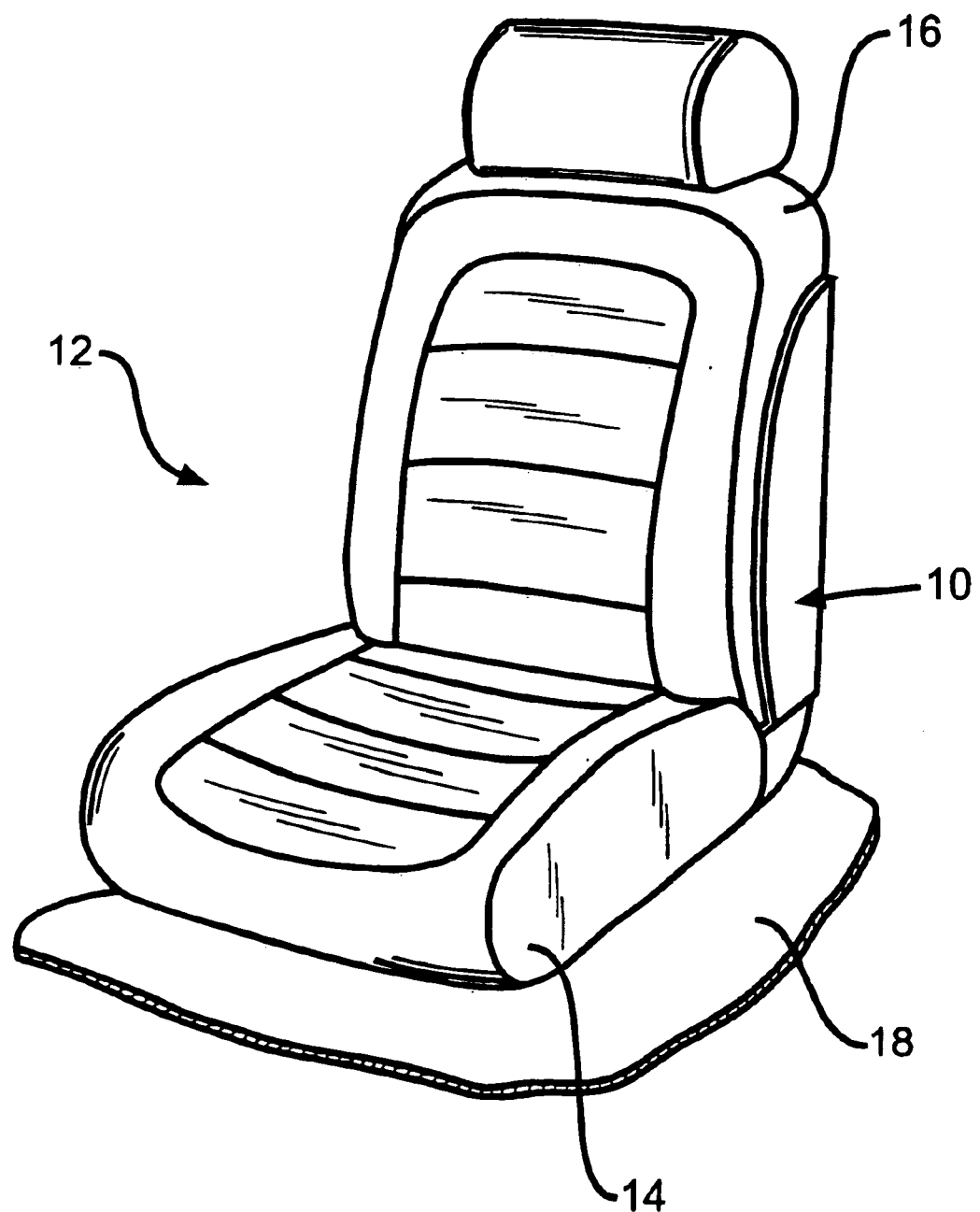
FIG. 1 is a perspective view of a vehicle seat having the latch mechanism of the present invention.

Referring now to the drawings, there is illustrated in FIG. 1, a perspective view of a vehicle seat 12 having the seatback dump latch of the present invention indicated generally at 10. The seat 12 has a seat bottom 14 and a seatback 16 that preferably folds down over the seat bottom 14. The seat pivot point is generally located about the joint between the seat bottom 14 and the seatback 16. The seatback 16 may optionally be adapted to be reclined for the comfort of the user. The seat 12 can be a front seat or a rear seat and is preferably a rear seat for use with the present invention. The seat 12 is fixed to the floor 18 of a vehicle by any conventional means. The seat 12 may also optionally slide on the floor 18 for fore and aft positioning of the seat 12 relative to the vehicle, as is known in the art.

Figure 2:
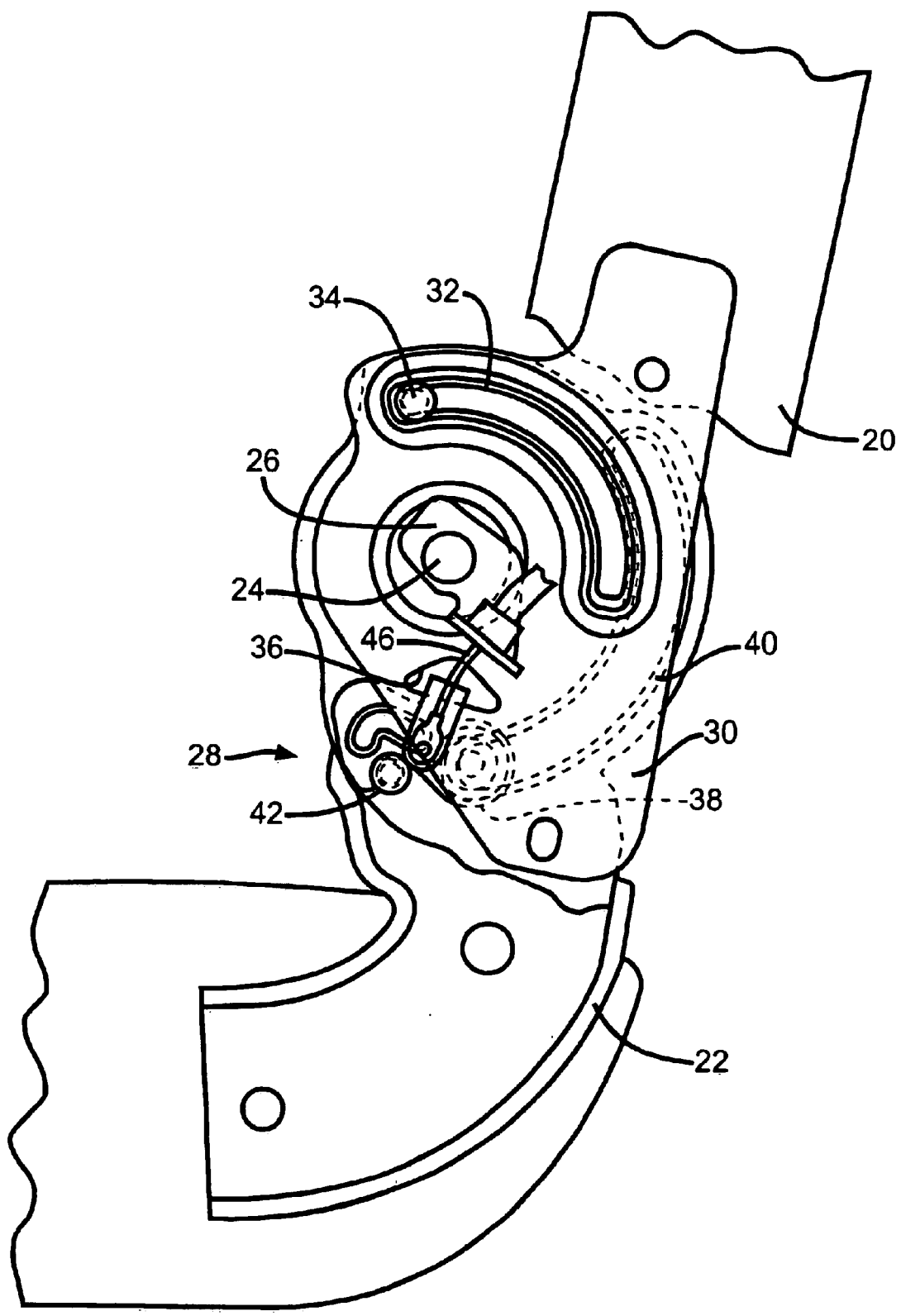
FIG. 2 is a side view of vehicle seat support members held in a locked position by the seatback sump latch of the present invention.

Illustrated in FIG. 2 is the seatback dump latch of the present invention pivotably attached to the seat frame. Specifically, shown is a portion of an upper seatback support member 20 and a portion of a seat bottom support member 22. The seatback 16, and thus the seatback support member 22, is movable relative to the seat bottom 14 about the seat pivot point 24. Positioned about the seat pivot point 24 is a dump actuator mechanism 26. However, the dump actuator 26 can be positioned anywhere about the seatback dump assembly. The dump actuator mechanism 26 is adapted to engage the latch mechanism of the present invention, indicated generally at 28. Additionally, the dump actuator 26 is connected to an operator controlled release device (not shown) such as a handle, pull strap, switch or other mechanism. The operation of the dump actuator 26 will be described in greater detail below. Positioned about the seat pivot point 24 is a track plate 30. The plate 30 is preferably supported between the dump actuator mechanism 26 and the seatback support member 20. The plate 30 can also be integrally formed with the seatback support member 20 or can be affixed therewith in any other manner. The plate 30 has a first track 32 formed therein such that the track 32 engages a track pin 34 formed on an upper portion of the seat bottom support member 22. The first track 32 and track pin 34 act as a guide for the upper seat support member 20 as it pivots relative to the seat bottom support member 22. The plate 30 also has a generally triangular notch 36 formed therethrough. The notch 36 is adapted to engage the bridge 64 of the arm 60 of the latch 28. The detail of the latch body 50 can be seen more clearly in FIGS. 8–10 and is described below. The arm 60 preferably is positioned on one side of the plate 30 with the body 50 of the latch 28 being positioned between the plate 30 and the upper portion of the seat bottom support member 22. Also positioned between the plate 30 and the seat bottom support member 22 is a spiral spring 38 that biases the latch into a first position. Formed on the upper portion of the seat bottom member 22 is a second track 40. The second track 40 engages the body 50 of the latch 28 at the latch pivot point. When the seatback 16 is pivoted relative to the seat bottom 14, the latch 28 and the plate 30 also move relative to the seat bottom support member 22. The second track 40 acts as a guide for the plate 30 as the seatback support member 20 pivots relative to the seat bottom support member 22. Also formed on the seat back support member 22 is a latch hook retention pin 42. The latch hook retention pin 42 is preferably adapted to engage the seatback dump latch 28. It is further preferred that the retention pin 42 engages the hook of the latch 28 when the seatback 16 is in a locked position such that the hook engages the retention pin 42 to resist forward motion of the seatback support member 20 relative to the seat bottom support member 22 as will be described in greater detail below.

Illustrated in FIG. 2 are the seatback support member 20, and particularly the seatback dump latch 28, in a locked first position. In a locked position, the seatback support member 20 and the seatback (not shown) are restrained from moving in a forward direction or being dumped. Additionally, the seatback 16 is prevented from moving in a further backward direction by the track pin 34 and the means for connecting the latch 28 to the plate 30 engaging the second track 40. In the first position the hook 52 of the seatback dump latch 28 is in a lowered position. The spiral spring 38 is positioned about the hole 54 of the latch 28 and a portion of the spring 38 is therefore in engagement with the second track 40 of the seat bottom support member 22. The spring 38 is further supported by the triangular notch 36 in the plate 30. The spring 38 resists the motion of the latch 28 into a second position, such as when the latch 28 is in a raised position. As a result, this design prevents the seat 12 from chucking. Also, the pin and track design allows the seat support members 20 and 22 to securely support the seatback 16 and seat bottom 14. To release the seatback 16 from the locked position, the dump actuator mechanism 26 can be actuated. The operator of the controls can manually or electronically releases the dump actuator 26. The actuator 26 then rotates about the seat pivot point 24. As the actuator 26 rotates, cables 46 connecting the aperture 62 in the arm 60 of the latch 28 to the actuator 26 pull the arm 60 of the latch 28 in an upward direction. This causes the latch body 50 to also move in an upward direction into a second position against the bias of the spiral spring 38. As the latch 28 moves upward, the hook 52 disengaged from the latch hook retention pin 42, thereby releasing the latch 28 from the retention pin 42. The latch 28 moves into the second position when the dump actuator mechanism 26 is actuated and thus the latch 28 is raised due to the outer edge 66 of the hook 52 sliding on the latch hook retention pin 42. Once unlocked, the seatback 16 can move freely relative to the seat bottom 14 as described above.

Figure 3:
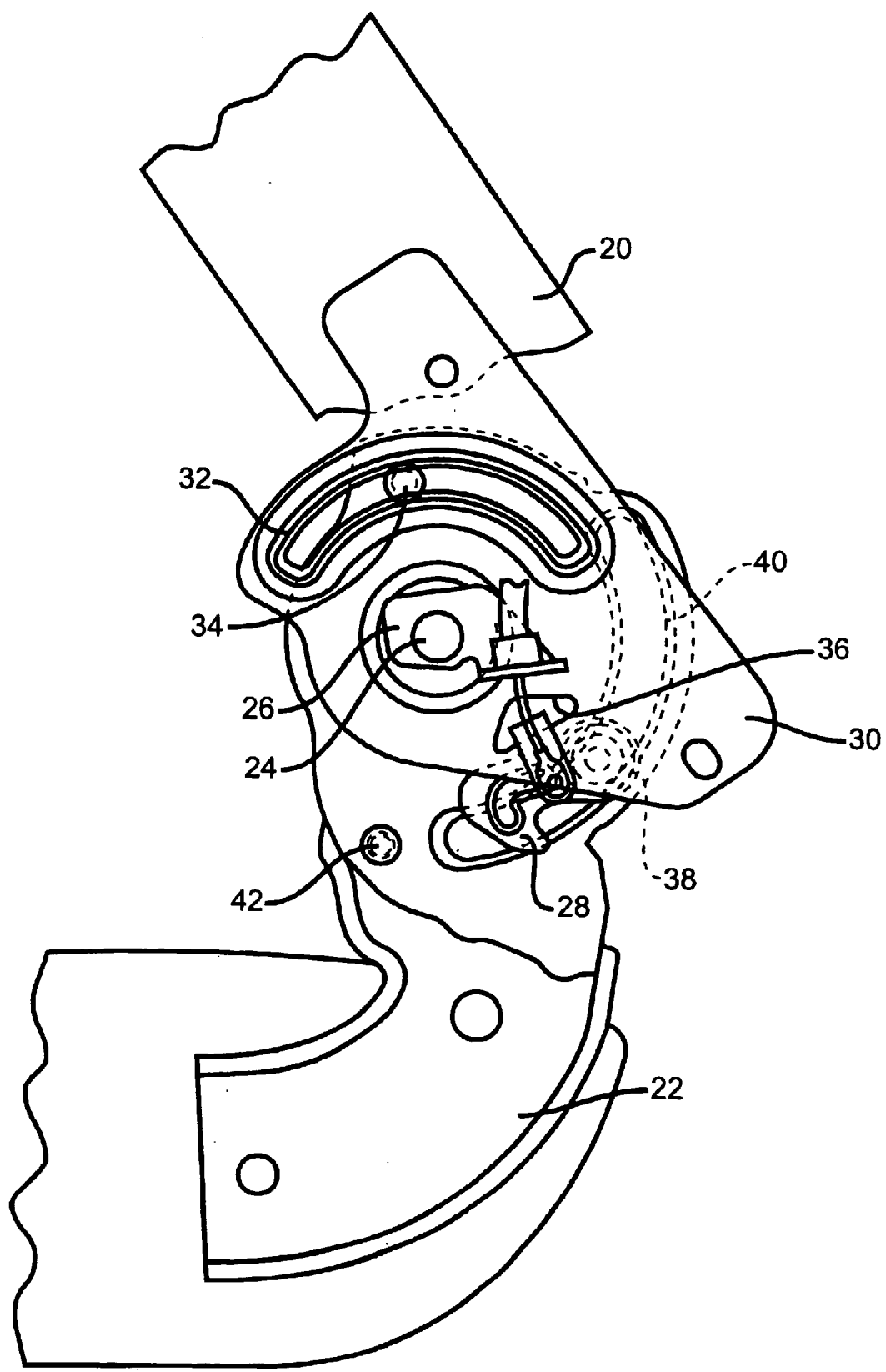
FIG. 3 is a side view of the vehicle seat support members in an unlocked and partially dumped position.

The motion of the seatback support member 20 relative to the seat bottom support member 22, and particularly the motion of the latch member 28 with the seat frame members can be seen more clearly in FIG. 3. In FIG. 3, the latch member 28 is in unlocked position and the seatback support member 20 has been moved into a partially dumped position. The plate 30 has rotated slightly as can be seen by the relative positions of the first track 32 and the track pin 34. Also shown is the hole 54 of the latch 28 in a position further along the second track 40. Additionally, the hook portion 52 of the seatback dump latch 28 is disengaged from the latch hook retention pin 42. Due to the biasing of the spring 38, once the latch 28 has disengaged the latch hook retention pin 42, the latch 28 returns to the first latch position. The latch pivot point 68 can also be seen moved in a position along the second track 40 of the seat bottom support member 22. It should be understood that the seatback support member 20 can be moved into a further dumped position until the track pin 34 engages the second end of the first track 32, or the pivot point of the latch 28 engages the upper end of the second track 40. It is preferred that the ranges of motion of the track pin 34 and the latch pivot 68 be the same such that when the track pin 34 engages the second end of the first track 32, the pivot point of the latch 68 also engages the upper end of the second track 40. Similarly, it should be understood that the seatback support member 20 can be moved into an upright position by moving the seatback 16 in a rearward direction such that the end of the first track 32 moves toward the track pin 34 and the latch 28 moves toward the latch hook retention pin 42.

Figure 4:
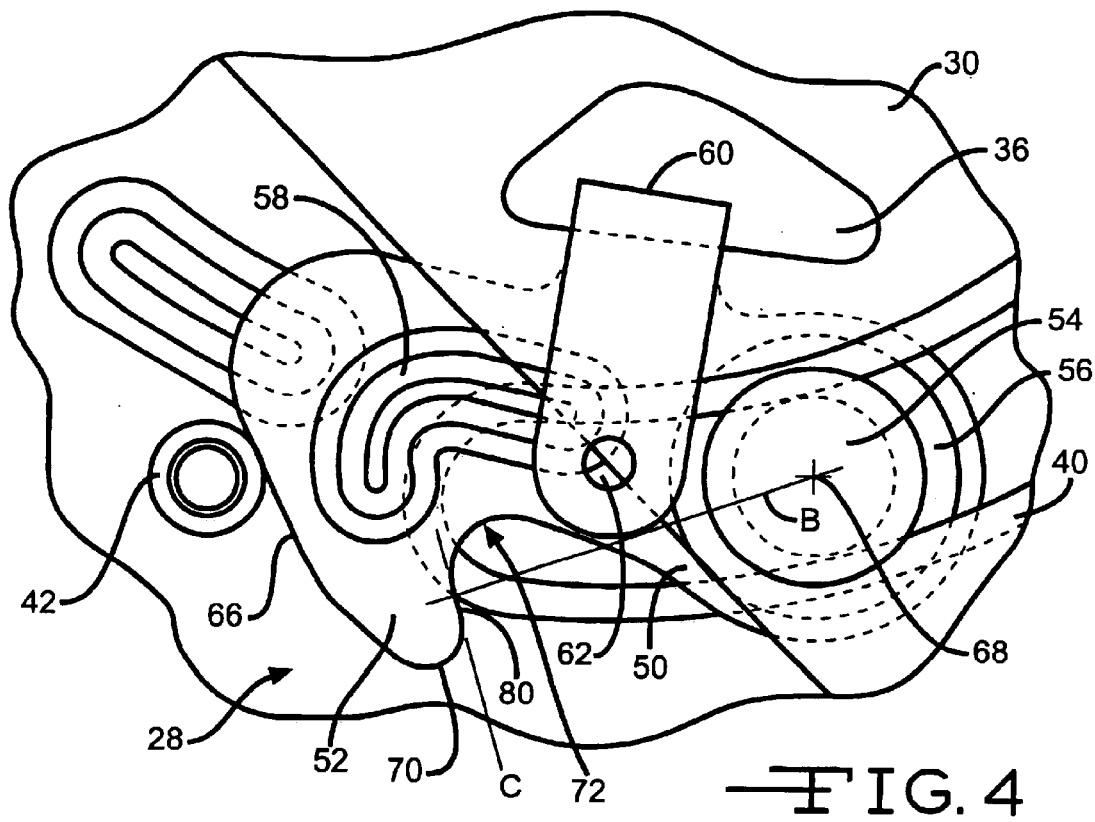
FIG. 4 is an enlarged side view of the latch mechanism of the present invention in an unlocked position.
Figure 5:
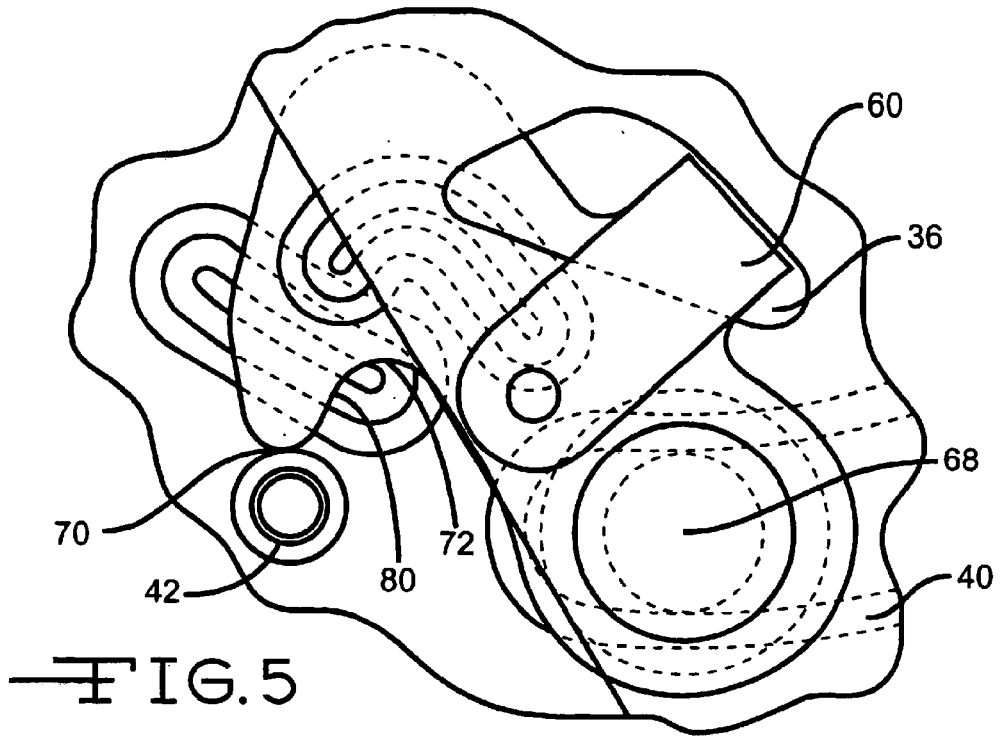
FIG. 5 is an enlarged side view of the latch mechanism of the present invention in a pivoted position.

Shown in FIGS. 4 through 7 is an enlarged side view of the latch of the present invention as the seatback is moved from a just-unlocked position to a firmly locked position. In FIG. 4, the outer edge of the hook 66 is in contact with the latch hook retention pin 42. From this position, the seatback support member 20 can freely rotate relative to the seat bottom support member 22. When the seatback support member 20 is moving in the opposite direction, such as when the seatback 16 is being returned to an upright position, the latch 28 would be in the illustrated position. As the seatback 16 is moved further upright, the outer edge 66 of the latch hook 52 is pressed against the latch hook retention pin 42. As the latch 28 presses against the latch hook retention pin 42, the angle of the outer edge 66 of the hook 52 causes the latch 28 to move against the bias force of the spiral spring 38. The outer edge of the hook 66, in turn, slides along the latch hook retention pin 42, rotating about the pivot point 68, and moves the latch 28 in an upward direction. As the seatback 16 moves further into an upright position, the curved end 70 of the hook 52 contacts the top of the latch hook retention pin 42 (illustrated in FIG. 5). As the seatback 16 is moved further upright, the hook 52 continues to move toward the latch hook retention pin 42. As the inner surface 72 of the hook 52 moves around the latch hook retention pin 42, the spiral spring 38 begins to force the latch 28 into the locked or engaged position.

Figure 6:
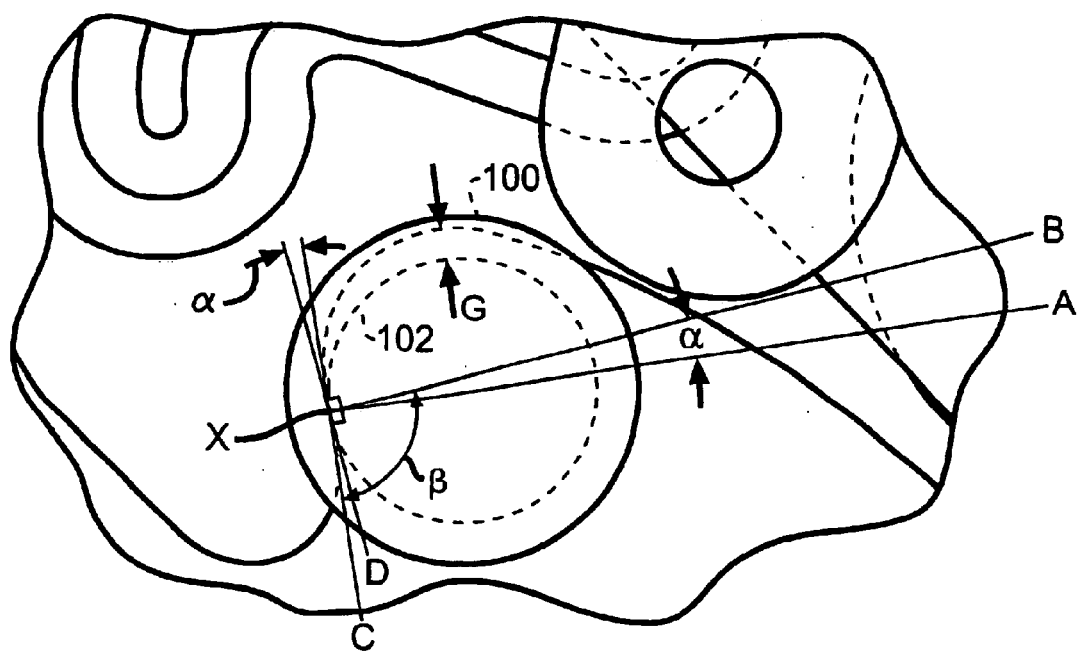
FIG. 6 is an enlarged side view of the latch in a first locked and seated position.

Shown in FIG. 6 is a further enlarged view of the hook portion of the seatback dump latch in a locked position. The space between the inner edge 100 of the hook 52 and the surface 102 of the latch hook retention pin 42 is separated by a gap, G. The gap, G can be slightly larger or smaller, and will vary with manufacturing tolerances. However, due to the static angle, α, the latch 28 will be prevented from unlatching because of the gap, G. The inner edge 100 of the hook 52 has a generally flat area 80 between the curved tip of the hook 52 and the curved innermost edge 100 of the hook. As the hook 52 moves towards the locked position, the flat area 80 initially contacts the latch hook retention pin 42. Indicated by line A is a line that passes through the contact point of the flat area 80 and the center point of the latch hook retention pin.

Also shown is line B which passes from the contact point X through the center of the pivot point 68 of the latch. Contact point X can be at any point along the flat area 80 of the inner surface of the latch hook 52. The angle between line A and line B is defined by the angle alpha, α. Line C corresponds to the flat area 80 and is co-linear therewith. Line C is perpendicular to line A and line D is perpendicular to line B. The significance of this angle is that using the angle alpha, α, allows the flat area 80 of the hook 52, located between the outer curved end 70 and inner curved end 72, to contact the latch hook retention pin 42 at any point along the flat area 80 based on system tolerances. There should not be a gap (which causes chucking) between the flat area 80 and the latch hook retention pin 42 because the flat area 80 "cams in" on the latch hook retention pin 42, and therefore remains in contact with the pin 42. The distance from the center of the latch hook 28 pivot point to the inner start of the flat area 80 of the hook 52 is less than the distance from the center of the latch hook 28 pivot point to the end of the flat area 80 of the hook 52. The flat area 80 closes in on the latch hook retention pin 42 until contact is made. It has been found that an angle of about 5.7 degrees is preferred. The reason for this is that the static angle of impending motion for greased steel on steel, such as the latch hook 52 on the latch hook retention pin 42, is 5.7 degrees. Generally, if the angle alpha, α, is less than 5.7 degrees the latch hook 28 may not back off and thus may self release from the latch hook retention pin 42 when a rotational force is applied to seat back support member 20. If the angle is greater, the latch hook 28 could release depending on the friction coefficient.

Figure 7:
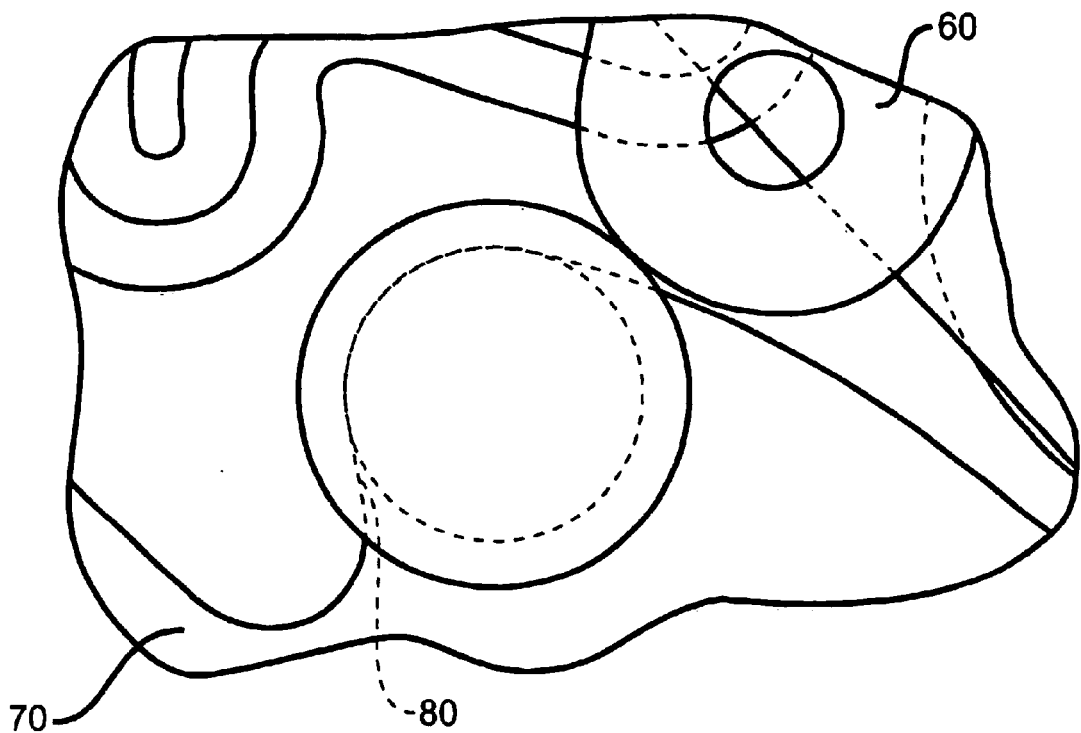
FIG. 7 is an enlarged side view of the latch in a second locked and seated position.

Shown in FIG. 7, the hook is shown in a perfectly locked position wherein the arcuate inner edge of the hook engages the opposite side of the latch hook retention pin. The position is considered a perfectly locked position, since due to manufacturing tolerances, such a close match is unlikely to occur. As the latch moves into this position, the spiral spring further biases the latch into this position and the hook engages the latch hook retention pin thereby preventing dumping and chucking of the seatback. Primarily, the chucking is prevented because the angle described above prevents motion of the latch relative to the latch hook retention pin when the seatback is in an upright and locked position.

The latching device of the present invention, as disclosed herein and shown as attached between a vehicle seatback and seat bottom, should be understood as being able to be adapted to attach between a seat back, a seat bottom, and/or a seat track.

Illustrated in FIG. 8 is a perspective view of the seatback dump latch 28 of the present invention. The seat back dump latch 28 has a generally flat body 50 having a first and second end. The first end of the body 50 is generally hook shaped 52. The second end of the body 50 has a generally circular hole 54 formed therethrough. Formed on a portion of the hook 52 is a raised surface 58, forming a rib, that generally follows the curve of the hook 52. The rib 58 is designed to increase the structural strength of the latch body 50. The hook portion 52 of the body 50 has an inner surface 72 that is generally arcuate in shape. However, the area where the inner and outer arcs of the hook 52 meet can be a generally flat area 80, described above. The outer edge surface 66 of the hook 52 preferably also includes a generally flat portion 66 as described above. The hole 54 formed in the body 50 is a pivot point 68 for the latch. It is preferred that the pivot point 68 be located at the center of the hole 54. Means for attaching the latch 28 to the seat frame preferably pass through the hole 54. However, it is preferred that the latch 28 is also pivotably movable relative to the seat frame. An arm 60 extends away from the body 50 at a point between said first and second ends. The arm 60 is adapted to engage the notch 36 in the plate of the seatback support member 20 as described above.

The arm 60 is best shown as illustrated in FIG. 9, as a cross-section of the latch through line 9—9 including a bridge 64 that extends generally perpendicularly to the body 50 of the latch 28. The arm 60 is in a plane that is generally parallel with the body 50 and spaced away from the body 50 by the bridge 64. The shape of the arm 60 is preferably generally rectangular at the first end that is connected to the bridge 64 and along the length of the body of the arm 60. At the second, distal end the arm 60 is semicircular in shape. However, it is understood that the entire arm 60 can be generally rectangular or have any other suitable shape. Additionally, at the second end there is an aperture 62 formed therethrough. The aperture 62 is adapted to receive the cables 46 that connect with the dump actuator mechanism 26, as described above.

The body 50 of the latch 28 is further illustrated in FIG. 10 as a cross-section of the latch 28 through line 10—10. As described above, the hook portion 52 has a rib 58 for increased strength. About the pivot point 68 of the latch 28, the hole 54 also has a generally circular raised portion 56 thereabout. The purpose of the raised surface 56 is similar to that of the hook rib 58. Also, the raised generally circular hole portion 56 can engage the second track 40 and thereby provide a surface upon which the latch 28 pivots and moves in the track 40. It is further preferred that the surface of the circular raised portion 56 or the surface of the second track 40 be coated to create a smooth surface upon which the latch 28 can travel.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A seat latch assembly comprising:
   a seat bottom having a first frame member;
   a seat back having a second frame member partially mounted on said first frame member of said seat bottom about a first pivot; and
   a latch mechanism including
      a pin mounted on one of said first and second frame members;
      a latch pivotally attached to the other of said first and second frame members about a second pivot, said latch having an open angled hook portion;
   wherein said latch is movable about said second pivot between a disengaged position wherein said hook portion is spaced from said pin, and an engaged position wherein said hook portion is in contact with said pin to hook said pin to prevent said first frame member from pivoting relative to said second frame member about said first pivot,
      wherein said latch includes an outer cam edge, and wherein said latch is positioned relative to said pin such that during movement of said latch from said disengaged position to said engaged position said outer cam edge first contacts said pin and further movement causes sliding motion of said pin relative to latch against the bias force of a spring;
      and wherein one of said first and second frame members includes a slotted track for receiving a second pin mounted on the other of said first and second frame members such that said second pin is in sliding engagement with said slotted track slides during pivoting motion between said first and second frame members.

2. The seat latch assembly defined in claim 1, wherein said latch includes protruding strengthening ribs.

3. The seat latch assembly defined in claim 1 wherein said hook portion includes a flat formed therein defining a first line, wherein the line is formed at an angle β which is greater that 90 degrees relative to a second line defined by a line extending through the second pivot and the flat.

4. The seat latch assembly defined in claim 3 wherein said pin and said latch are formed of steel, and wherein the angle β is about 95.7 degrees such that a static angle of impending motion for greased steel on steel is provided.

5. The seat latch assembly defined in claim 3 wherein said flat is formed on an inner edge of said hook portion.

6. The seat latch assembly defined in claim 1, wherein said spring is a spiral spring co-axial housed with the pivot point of said latch.

7. The seat latch assembly defined in claim 1, wherein an end portion of said slotted track defines a stop for preventing further movement of said first frame member relative to said second frame member.

8. The seat latch assembly defined in claim 1, wherein said latch includes an arm extending from a main portion.

9. The seat latch assembly defined in claim 8, wherein one of said first and second frame members includes a slot formed therein, and wherein said arm extends through said slot of said one of said first and second frame members.

10. The seat latch assembly defined in claim 9, wherein said arm includes a bridge portion extending between an end portion of said ann and said main portion.

11. The seat latch assembly defined in claim 10, wherein said bridge portion extends through said slot of said one of said first and second frame members.

12. The seat latch assembly defined in claim 11, wherein said end portion includes an aperture for receiving an end of a cable for pivoting said latch.

13. The seat latch assembly defined in claim 12, wherein said latch includes a raised portion surrounding said aperture.

14. The seat latch assembly defined in claim 13, wherein said raised portion is in sliding engagement with one of said first and second frame members.

* * * * *